United States Patent
Park

(10) Patent No.: US 7,693,799 B2
(45) Date of Patent: Apr. 6, 2010

(54) WIRELESS COMMUNICATION TERMINAL SUSPENDING INTERRUPT DURING RF PAYMENT AND METHOD THEREOF

(75) Inventor: Chan-Geon Park, Seoul (KR)

(73) Assignee: Pantech&Curitel Communications, Inc., Seoul (KR)

( * ) Notice: Subject to any disclaimer, the term of this patent is extended or adjusted under 35 U.S.C. 154(b) by 1230 days.

(21) Appl. No.: 11/154,131

(22) Filed: Jun. 15, 2005

(65) Prior Publication Data

US 2006/0100966 A1 May 11, 2006

(30) Foreign Application Priority Data

Nov. 8, 2004 (KR) ...................... 10-2004-0090346

(51) Int. Cl.
*G06F 17/60* (2006.01)
(52) U.S. Cl. .......................................... 705/67; 705/64
(58) Field of Classification Search .................... 705/67, 705/64
See application file for complete search history.

(56) References Cited

U.S. PATENT DOCUMENTS

| | | | |
|---|---|---|---|
| 6,771,981 B1 * | 8/2004 | Zalewski et al. ............ | 455/557 |
| 6,819,219 B1 * | 11/2004 | Bolle et al. ................. | 340/5.52 |
| 7,228,155 B2 * | 6/2007 | Saunders ...................... | 455/558 |
| 2004/0030601 A1 * | 2/2004 | Pond et al. ..................... | 705/16 |
| 2004/0038690 A1 * | 2/2004 | Lee et al. ..................... | 455/466 |
| 2006/0074698 A1 * | 4/2006 | Bishop et al. .................. | 705/1 |
| 2006/0074813 A1 * | 4/2006 | Saunders ...................... | 705/67 |
| 2007/0011099 A1 * | 1/2007 | Sheehan ....................... | 705/65 |

FOREIGN PATENT DOCUMENTS

JP         2008005042 A  *  1/2008

* cited by examiner

*Primary Examiner*—Pierre E Elisca
(74) *Attorney, Agent, or Firm*—H.C. Park & Associates, PLC

(57) ABSTRACT

Provided is a wireless communication terminal for mobile commerce that can suspend events during Radio Frequency (RF) payment, and a method thereof. The terminal for mobile commerce can secure integrity of the mobile commerce by suspending events generated during the RF payment of a mobile commerce. The terminal includes: a storage for storing a pre-established authentication number; a keypad for receiving a mobile commerce request and an authentication number; a controller for requesting authentication for the mobile commerce to an authenticator in response to the mobile commerce request, analyzing an authentication response message from the authenticator; and the authenticator for authenticating the mobile commerce; an RF antenna for transmitting/receiving an RF signal for a function of the mobile commerce under the control of the controller; and a display for displaying the mobile commerce process.

5 Claims, 2 Drawing Sheets

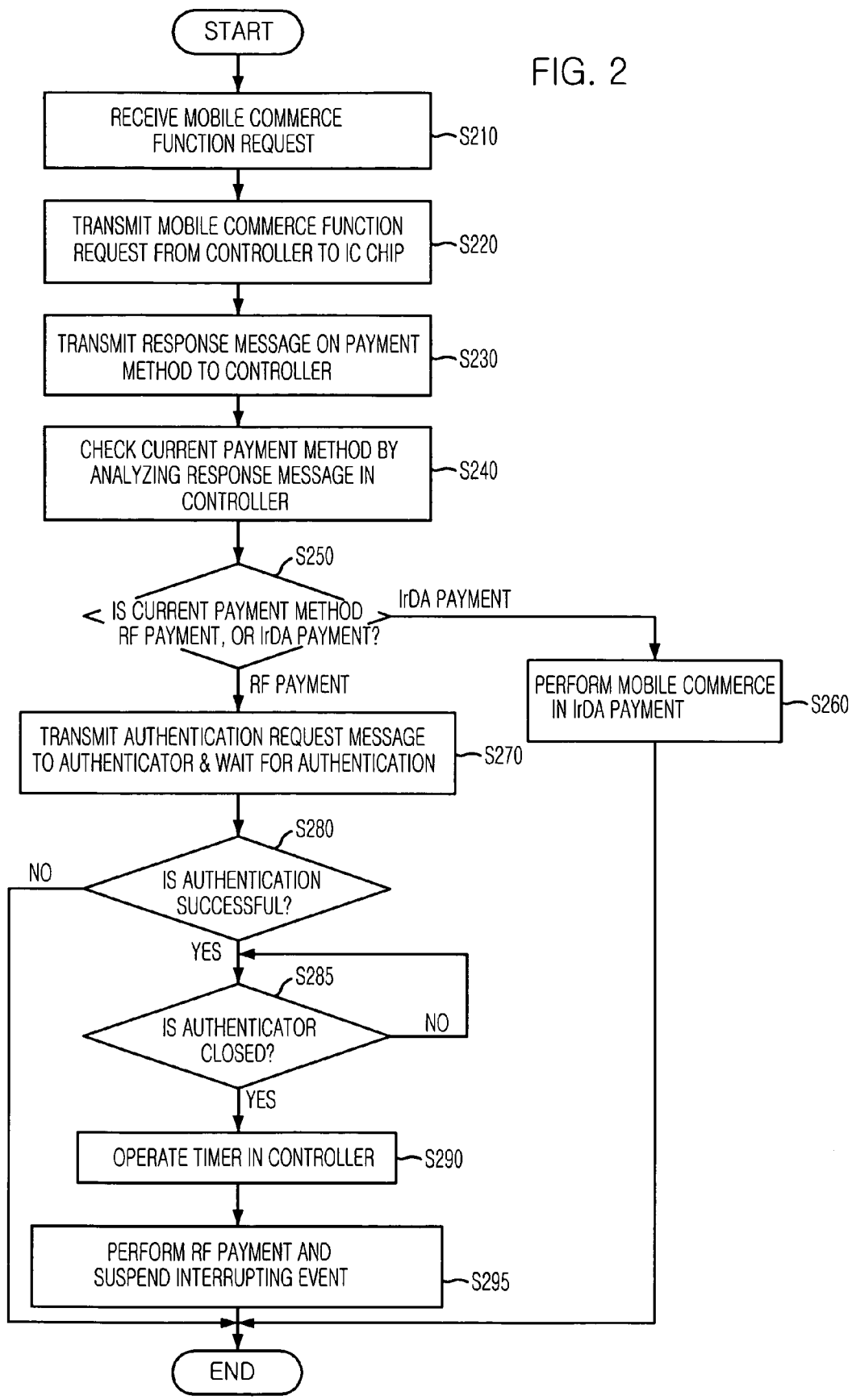

WIRELESS COMMUNICATION TERMINAL SUSPENDING INTERRUPT DURING RF PAYMENT AND METHOD THEREOF

CROSS REFERENCE TO RELATED APPLICATION

This application claims priority from and the benefit of Korean Patent Application No. 10-2004-0090346, filed on Nov. 8, 2004, which is hereby incorporated by reference for all purposes as if fully set forth herein.

FIELD OF THE INVENTION

The present invention relates to a mobile commerce terminal; and, more particularly, to a mobile commerce wireless communication terminal for securing integrity of the mobile commerce function by suspending events generated while the mobile commerce is performed in a radio frequency (RF) payment, and a method thereof.

DESCRIPTION OF RELATED ART

Hereinafter, the mobile commerce wireless communication terminal means a terminal having an authentication chip which makes it possible to perform mobile commerce in a wireless communication terminal that can be carried by a user. The mobile commerce wireless communication terminal includes a mobile communication terminal, a Personal Communication Service (PCS) terminal, a Personal Digital Assistant (PDA) terminal, a smart phone, an International Mobile Telecommunication 2000 (IMT-2000) terminal, and a wireless Local Area Network (LAN) terminal.

Among the many advantages of the wireless communication terminal, the most advantageous feature is the mobility provided to a user. Due to the advantage of mobility, the number of wireless communication service subscribers grows in a geometrical progression and, recently, the wireless communication terminal is spread and used popularly among ordinary people.

Lately, many functions are added to the wireless communication terminal to provide more convenience to users. One of the functions is mobile commerce.

Herein, mobile commerce means a service that supports commercial transaction with the wireless communication terminal, i.e., an electronic information communication device.

Generally, while e-commerce means all kinds of electronic transactions, the mobile commerce signifies transactions having cash value which is carried out through a wireless communication network and a wireless communication terminal.

To sum up, the mobile commerce includes all business activities derived from accessing to an e-commerce system through a public wireless communication network and a PCS terminal, a PDA terminal, and other wireless terminals and supporting to process a transaction.

Also, the mobile commerce can include a variety of services supporting the transaction to meet the demand of a buyer and service of a seller, such as data the seller provides before and after the selling of goods in the broad meaning.

Terms generally called m-commerce, mobile electronic commerce, and wireless mobile electronic commerce have the same meaning as the mobile commerce used in the present specification.

As for the representative functions of the mobile commerce, there are mobile banking, mobile securities service, mobile coin, and mobile payment gateway.

The above-mentioned terms can be a little different according to companies providing the mobile commerce.

The mobile banking service provides diverse services that are provided conventionally in banks, e.g., an account balance inquiry, a money transfer service, a Giro payment service, a fixed deposit service and a credit card service through the wireless Internet. The mobile banking service combines the convenience of a telebanking accessing method, in which clients can be provided with safe, accurate and quick banking services at any time in anywhere, and the excellent security system of the Internet banking.

The mobile securities service provides conventional Web-based securities service to users through the wireless communication terminals so that the users can inquiry securities data and sell or buy stocks at any where at any time.

The mobile coin makes it possible for a user to buy goods instantly by calling a wireless communication terminal set up in an automatic vending machine at its identity number by using a wireless communication terminal of the user, even though the user does not have any coins.

The mobile payment gateway service is a small amount payment system where, if a user wants to buy a digital content such as game, movie, music, comics, and education, the transaction and payment are carried out through the wireless communication terminal based on the telephone number and resident identification number of the customer and short messages.

In the mobile commerce, personal financial information such as credit card data are contained in an integrated circuit (IC) chip and payment is made in a Radio Frequency (RF) method or an Infrared Data Association (IrDA) method.

According to the IrDA method, the mobile commerce is carried out between the wireless communication terminal and a receiver through infrared communication. According to the RF method, the mobile commerce is carried out through high frequency communication between an RF antenna set up in the battery of the wireless communication terminal and a receiver.

Herein, the receiver is a terminal the wireless communication terminal contacts to make a payment, for example, a terminal the wireless communication terminal contacts to pay bus or subway fare and a terminal the wireless communication terminal having a mobile commerce function contacts to pay for goods at a grocery store or a shop.

Since the mobile commerce is a transaction involving money, security and reliability are important more than any thing else.

In the IrDA method, an 'IrDA open' function is called at the beginning of the mobile commerce and an 'IrDA close' function is called at the end of the mobile commerce. Therefore, a controller of the wireless communication terminal can recognize that the mobile commerce function is performed in the IrDA method from the calling of the IrDA open and IrDA close functions. If an event is generated during the mobile commerce, the controller of the wireless communication terminal suspends the event interrupting the mobile commerce to secure integrity of the mobile commerce.

Differently from the IrDA method, however, the RF method does not use an open function and a close function that inform the beginning and end of the mobile commerce. Therefore, the controller of the wireless communication terminal cannot recognize whether the mobile commerce is performed in the RF method and, thus, it cannot suspend the event generated in the middle of mobile commerce.

For this reason, a method for suspending an event generated in the middle of the mobile commerce is required to secure integrity of the mobile commerce.

SUMMARY OF THE INVENTION

It is, therefore, an object of the present invention to provide a wireless communication terminal for mobile commerce that can secure integrity of the mobile commerce function by suspending an event generated in the middle of the mobile commerce performed in a Radio Frequency (RF) method, and a method thereof.

In accordance with an aspect of the present invention, there is provided a wireless communication terminal for mobile commerce that can suspend events during RF payment, which includes: a storage for storing a pre-established authentication number; a keypad for receiving a mobile commerce request and an authentication number; a controller for requesting authentication for the mobile commerce to an authenticator in response to the mobile commerce request, analyzing an authentication response message from the authenticator; and the authenticator for authenticating the mobile commerce function by comparing the mobile commerce request from the controller, the authentication number inputted through the keypad, and the pre-established authentication number; a radio frequency (RF) antenna for transmitting/receiving an RF signal for a function of the mobile commerce under the control of the controller; and a display for displaying the process of mobile commerce under the control of the controller.

In accordance with another aspect of the present invention, there is provided a method for suspending events in a wireless communication terminal during the RF payment, which includes the steps of: a) transmitting a mobile commerce request; b) transmitting a response message containing information on a payment method set up in the wireless communication terminal in response to the request; c) checking the current payment method by analyzing the response message; d) confirming that the current payment method is RF method and receiving an authentication number for acquiring authentication to operate the mobile commerce in the RF method; e) if the authentication based on the authentication number is successful, inactivating the authenticator; f) operating a timer for a predetermined time and setting up a flag; and g) suspending events while performing RF payment.

BRIEF DESCRIPTION OF THE DRAWINGS

The above and other objects and features of the present invention will become apparent from the following description of the preferred embodiments given in conjunction with the accompanying drawings, in which:

FIG. 2 is a flowchart describing a method for suspending interrupt during RF payment in the mobile-commerce wireless communication terminal in accordance with an embodiment of the present invention.

DETAILED DESCRIPTION OF THE INVENTION

Figure 1:
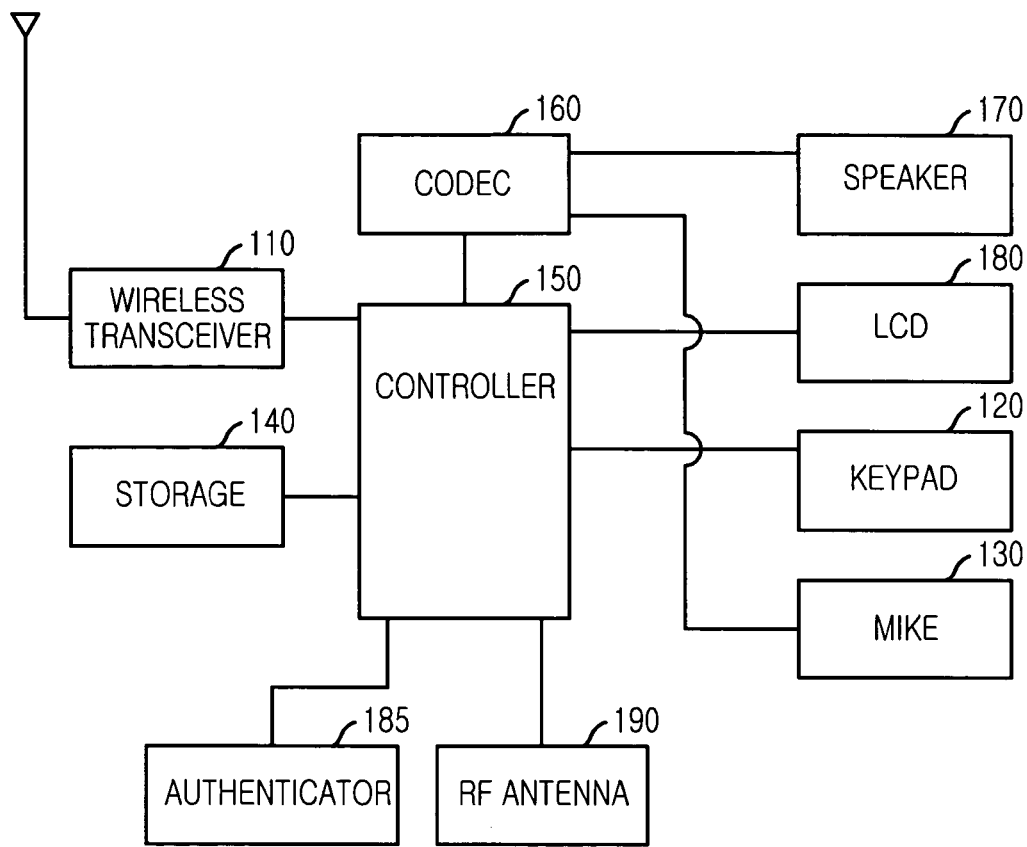
FIG. 1 is a block diagram illustrating a mobile-commerce wireless communication terminal capable of suspending interrupt during Radio Frequency (RF) payment in accordance with an embodiment of the present invention.

Other objects and aspects of the invention will become apparent from the following description of the embodiments with reference to the accompanying drawings, which is set forth hereinafter. Also, if detailed description on a prior art is considered to blur the point of the present invention, the description will be omitted. Hereafter, the present invention will be described with reference to the accompanying drawings.

FIG. 1 is a block diagram illustrating a mobile-commerce wireless communication terminal capable of suspending interrupt during Radio Frequency (RF) payment in accordance with an embodiment of the present invention.

As shown, the mobile commerce wireless communication terminal capable of suspending an event generated during the mobile commerce performed in the RF payment includes: a wireless transceiver 110, a input unit 120 such as a keypad, a controller 150, an authenticator 185, an RF antenna 190, a display 180, e.g., Liquid Crystal Display (LCD), a storage 140, a CODEC 160, a speaker 170, and a microphone (mike) 130.

The wireless transceiver 110 transmits/receives radio signals through a wireless communication network, e.g., the wireless Internet. The keypad 120 receives a request for a mobile commerce function and an authentication number. The controller 150 checks the current payment method of the wireless communication terminal and whether the mobile commerce function is in operation from the authenticator 185 based on the mobile commerce request and the authentication number transmitted from the keypad 120 and suspends an event generated during the operation of the mobile commerce. The authenticator 185 authenticates the operation of the mobile commerce based on the mobile commerce request and the authentication number transmitted from the controller 150. The RF antenna 190 supports a payment function of the functions of the mobile commerce under the control of the controller 150. The LCD 180 displays the processes of the mobile commerce under the control of the controller 150. The storage 140 stores a program for operating the wireless communication terminal, file systems, e.g., images, characters, and icons, and a mobile commerce program. The CODEC 160 converts the signal transmitted from the wireless transceiver 110 into speech data and outputs the speech data to the speaker 170, and it converts speech data inputted from the mike 130 into signals, transmits the signals to the controller 150, and outputs the signals through the wireless transceiver 110 under the control of the controller 150. The speaker 170 outputs the speech data transmitted from the CODEC 160. The mike 130 receives the speech data and transmits the speech data to the CODEC 160.

The controller 150 controls the entire operation of the wireless communication terminal and the elements thereof. Also, the controller 150 transmits a message for requesting the mobile commerce function, i.e., a mobile commerce request message, to the authenticator 185 in response to the mobile commerce request inputted through the keypad 120. In response to the mobile commerce request message, the authenticator 185 transmits a response message to the controller 150, and the controller 150 analyzes the response message from the authenticator 185 and confirms the payment method of the mobile commerce, i.e., Infrared Data Association (IrDA) payment or RF payment, from the wireless communication terminal.

The controller 150 transmits the mobile commerce request message to the authenticator 185 based on the authentication number inputted through the keypad 120 and receives a response message from the authenticator 185. It checks whether or not the mobile commerce function is in operation by analyzing the response message.

The controller 150 operates a timer for a predetermined time during the mobile commerce performed in the RF method and sets up a flag. While the flag is set up, the controller 150 recognizes that the mobile commerce is in operation in the RF method and suspends an event generated during the period. After a predetermined time is passed, the flag is revoked and events generated after the revocation of the flag are not suspended.

The storage 140 stores the operation program of the controller 150, a system program, and a mobile commerce program. The operation program and the system program are stored in the conventional Read-Only Memory (ROM) domain and, if necessary, they can be eliminated. The storage 140 includes a Random Access Memory (RAM) that temporarily stores data generated during the functioning of various operation programs.

Since the storage 140 stores the authentication number, the authentication number is referred to when it is determined whether to authenticate or not in the authenticator 185.

The keypad 120 includes a plurality of number keys which are also used to input letters, menu keys, and function keys for operating various functions. The keypad 120 outputs key data to the controller 150 by external manipulation. Also, the keypad 120 receives the mobile commerce request and the authentication number for obtaining authentication to perform the mobile commerce from the user.

The LCD 180 displays the state of the wireless communication terminal and the operation states of a program under the control of the controller 150. In other words, it displays the general state of the wireless communication terminal and what is inputted through the keypad 120. It also shows the user the authentication number inputted by the user and the procedures of the mobile commerce.

The authenticator 185 includes credit information and private information of the subscriber using the wireless communication terminal and determines whether to authenticate the mobile commerce through the wireless communication terminal. The authenticator 185 includes an Integrated Circuit (IC) chip, which is a module mounted in a logic circuit of a computer memory or a microprocessor.

FIG. 2 is a flowchart describing a method for suspending interrupt during RF payment in the mobile-commerce wireless communication terminal in accordance with an embodiment of the present invention.

First, at step S210, a request for mobile commerce is inputted by a user. At step S220, the controller 150 transmits a mobile commerce request to the authenticator 185 upon the mobile commerce request of the user.

At step S230, the authenticator 185 transmits a response message in response to the mobile commerce request message from the controller 150. The response message contains information on the payment method carried out in the wireless communication terminal when the wireless communication terminal performs mobile commerce.

As describe above, the wireless communication terminal can make a payment in the IrDA method and the RF method. The response message contains information on the payment method set up in the wireless communication terminal.

Subsequently, at step S240, the controller 150 checks out the payment method set up in the wireless communication terminal by analyzing a least amount of packets related to the RF method among the response message transmitted from the authenticator 185.

For example, the last 1 byte of the response message is checked and if the last byte is "0x0", it signifies that the payment method of the wireless communication terminal during the mobile commerce is the IrDA method. If the last byte of the response message is "0x1," it means that the payment method of the wireless communication terminal during the mobile commerce is the RF method.

At step S250, it is determined whether the payment method is the RF method or the IrDA method. If the payment method is the IrDA method, at step S260, the payment in the mobile commerce is made through IrDA communication.

If the payment method is the RF method, at step S270, the controller 150 draws up an authentication request message based on the authentication number, which is inputted from the user to acquire authentication for the mobile commerce function, transmits the message to the authenticator 185, and waits for a message from the authenticator 185.

Subsequently, the authenticator 185 compares the authentication number inputted from the user with a valid authentication number which is pre-established in the authenticator 185 by analyzing the header which, for example, has 5 bytes of the authentication request message.

Then, the authenticator 185 informs the controller 150 of the authentication number analysis result through the authentication response message.

Upon receipt of the authentication response message, at step S280, the controller 150 checks whether the authentication is successful by analyzing predetermined bytes of the authentication response message.

At the step S280, if the authentication is failed, in other words, if the inputted authentication number is not valid, the user trying to execute the mobile commerce function through the wireless communication terminal is not authentic user. Therefore, the mobile commerce function is not carried out in the wireless communication terminal.

Meanwhile, if the authentication is successful, that is, if the authentication number inputted from the user is the same as the pre-established authentication number, at step S285, the controller 150 checks whether the authenticator 185 is closed before it performs the payment in the RF method.

As described above, if the authentication process is succeeded, the controller 150 recognizes that the payment is to be carried out in the RF method.

In other words, the controller 150 recognizes that the payment is to be performed in the RF method only after the above processes with the authenticator 185 is completed to secure integrity during the RF payment through the wireless communication terminal.

This is because there is no call for a specific function for the RF payment between the mobile commerce application and the controller 150. In other words, the RF payment is requested to secure integrity, but there is no specific function for recognizing the beginning and end of the RF payment.

Therefore, the controller 150 requests the RF payment by analyzing messages transmitted to and from the authenticator 185, in order words, by analyzing the least number of packets related to the RF payment in the messages, and it recognizes the beginning of the RF payment.

As described above, at the step S285, the controller 150 recognizes the beginning of the RF payment and checks out whether the authenticator 185 is closed or not.

The authenticator 185 should be closed necessarily before the beginning of the RF payment. In order to close the authenticator 185, an 'IC close' function should be called.

Meanwhile, the 'IC close' function is called frequently during the operation of the mobile commerce in the wireless communication terminal, whenever the RF payment is required. The 'IC close' function which inactivates the authenticator 185 and an 'IC open' function which eliminates the 'IC close' function will be described later in detail.

In the checking at the step S285, if the authenticator 185 is not closed, the controller 150 waits until the authenticator 185 is closed based on the 'IC close' function.

If the authenticator 185 is closed at the step S285, at step S290, the controller 150 operates the timer and sets up a flag during the time.

Herein, the timer is operated to secure time for performing the RF payment by bringing the wireless communication terminal close to the receiver. Therefore, the controller 150 shuts off the events generated during the RF payment through RF communication between the RF antenna 190 and the receiver to secure integrity.

While the timer is operated, the controller 150 recognizes that the payment is made in the RF method in the mobile commerce and suspends the events generated during the payment to secure the integrity.

Herein, the events that can interrupt the mobile commerce include alarm, call connection, and message reception.

In a predetermined time after the events are suspended and the payment is made in the RF method, the above-established flag is eliminated. After the removal of the flag, the controller 150 does not suspend the events any more.

As described above, the 'IC close' and 'IC open' functions for determining whether to activate the authenticator 185 are called whenever they are needed in order to perform the mobile commerce.

The 'IC close' function is used to suspend electric power or clock supplied to the authenticator 185. The 'IC close' function is called to close the authenticator 185, because a large quantity of electric power is supplied to the authenticator 185 and, if the authenticator 185 is in the state of activation all the time, the battery of the wireless communication terminal is worn out fast.

Also, the function of the authenticator 185 is not needed always and it is used only when a particular operation, for example, when it is determined whether to authenticate the mobile commerce, is performed. Therefore, it the authenticator 185 is activated by calling the 'IC close' and 'IC open' functions only when the function of the authenticator 185 is needed.

Since the authenticator 185 stores important data such as credit information and private information of the user, if it is activated all the time, the risk of information leakage is high. Therefore, activating the authenticator 185 only when a particular operation is performed can be a way of protecting information of the user.

As described above, the technology of the present invention can perform the mobile commerce safely by recognizing the RF payment beginning and end time points of the mobile commerce in the controller 150 and suspending the events during the RF payment to thus secure the integrity of the mobile commerce.

The method of the present invention can be realized as a program and stored in a computer-readable recording medium, such as CD ROM, RAM, ROM, floppy disks, hard disks, and magnetooptical disks. Since the process can be embodied by those of ordinary skill in the art, further description will not be provided herein.

The technology of the present invention can secure the integrity of the mobile commerce by suspending the events generated in the middle of the mobile commerce performed in the RF method in the wireless communication terminal.

The present application contains subject matter related to Korean patent application No. 2004-0090346, filed in the Korean Intellectual Property Office on Nov. 8, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A wireless communication terminal for mobile commerce that can suspend events during Radio Frequency (RF) payment, comprising:
    a storage for storing a pre-established authentication number;
    a keypad for receiving a mobile commerce request and an authentication number;
    a controller for requesting authentication for the mobile commerce to an authenticator in response to the mobile commerce request, analyzing an authentication response message from the authenticator, operating a timer for a predetermined time during the mobile commerce, setting up a flag so as to suspend events generated while the flag is set up and suspending events generated while performing RF payment;
    the authenticator for authenticating the mobile commerce function by comparing the mobile commerce request from the controller, the authentication number inputted through the keypad, and the pre-established authentication number;
    a radio frequency (RF) antenna for transmitting/receiving an RF signal for a function of the mobile commerce under the control of the controller; and
    a display for displaying the process of mobile commerce under the control of the controller.

2. The wireless communication terminal for mobile commerce as recited in claim 1, wherein the controller transmits the mobile commerce request and a message for inquiring the payment type set up in the wireless communication terminal to the authenticator and recognizes the current payment type by analyzing a response message from the authenticator.

3. The wireless communication terminal for mobile commerce as recited in claim 1, wherein the RF antenna is positioned in a battery of the wireless communication terminal.

4. The wireless communication terminal for mobile commerce as recited in claim 1, wherein the authenticator is an integrated circuit (IC) chip storing credit information and private information of a user.

5. A method for suspending events in a wireless communication terminal during Radio Frequency (RF) payment, comprising the steps of:
    a) transmitting a mobile commerce request;
    b) transmitting a response message containing information on a payment method set up in the wireless communication terminal in response to the request;
    c) checking the current payment method by analyzing the response message;
    d) confirming that the current payment method is RF method and receiving an authentication number for acquiring authentication to operate the mobile commerce in the RF method;
    e) if the authentication based on the authentication number is successful, inactivating the authenticator;
    f) operating a timer for a predetermined time and setting up a flag so as to suspend events generated while the flag is set up; and
    g) suspending events generated while performing RF payment.

* * * * *